Jan. 5, 1943.                E. C. MATIGNON                 2,307,286
                              FLOWER HOLDER
                           Filed Dec. 16, 1941
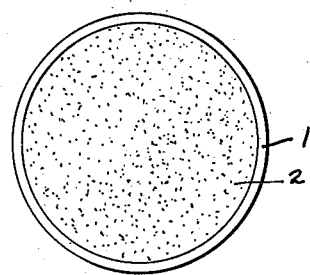
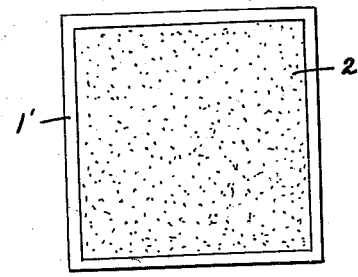
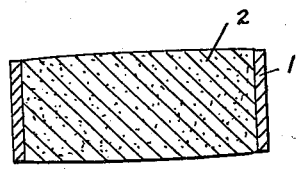
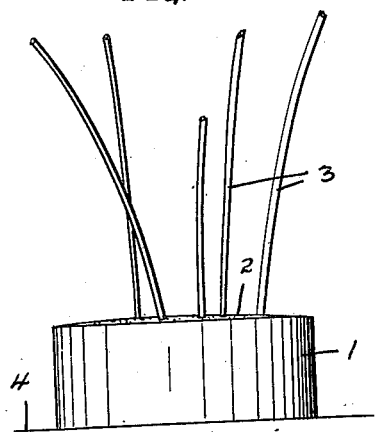
INVENTOR
EDMOND C. MATIGNON
per Boyken Mohler & Beckley
ATTORNEYS Patented Jan. 5, 1943

2,307,286

UNITED STATES PATENT OFFICE 2,307,286

FLOWER HOLDER

Edmond C. Matignon, Oakland, Calif.

Application December 16, 1941, Serial No. 423,140

4 Claims. (Cl. 47—41)

This invention relates to flower holders, and has for objects, an improved flower holder adapted to support artificial or dried flowers on a supporting surface in any desired, generally upright position, and from which holder the flowers are readily and quickly withdrawn and replaced, or a new arrangement of new flowers made while the holder is secured on said surface. Another object is the provision of a flower holder that is clean, economical to make, relatively light in weight, and substantially indestructible, and which holder is quickly detachable from a supporting surface, such as the bottom of a bowl, a table, a slab, or the like, without defacing such surface. A still further object is a flower holder having the characteristics noted in the foregoing objects that will firmly support artificial or dried flower arrangements on a supporting surface without wobbling, and which holder will function to support flowers without loss of efficiency irrespective of whether its upper or lower side engages the supporting surface on which the holder is positioned.

The act of arranging flowers in holders has been practiced for many years, and as aids in supporting flowers, many holders have been produced, chief among which have been the "pin type" holders, comprising a base with a mass of vertically spaced pins therein having their pointed ends uppermost. The stems of real flowers can be supported in such holders, but difficulty is encountered with artificial flowers, and in any event, the pins do not always support the flowers in the most desirable positions, since they obstruct insertion of the stems generally laterally into the mass of pins. The "dome type" holders overcome some of the objections to the "pin type" holders by providing a mesh structure resembling a cage secured on a weighted base, and the stems of the flowers are inserted through the mesh openings in the dome-shaped cage, but the disadvantage in this structure is the fact that the capacity of the holder is limited to the mesh openings, and the smaller stems are appreciably smaller than the openings, hence are free to roll around. Also, the stems will turn on their axis where the greatest weight carried thereby is at one side of the stems respectively, which is not always desirable to produce the arrangement desired. Prior to either the "pin type" and "dome type" holders certain persons have used moist sand in containers to support the flowers and to supply moisture thereto, but this required relatively large, weighted containers with the stems deeply embedded therein and substantially vertical stems with the weight close to the axes of the stems, and in the event the containers were accidentally upset, the sand would be spilled causing great inconvenience.

From the sand or earth containers the idea of substituting jelly-like material of relatively stiff consistency such as the material used in printers rollers was suggested but with no success since the same objections to a weighted container and to accidental upsetting were present. To avoid weighting the containers some persons tried the practice of using relatively non-drying, clay-like material on the bottoms of the containers, but while the clay-like material would stick to the supporting surface, it many times would be released from the container, and difficulty was encountered in making the container level as well as annoyance in changing the position of the container from one place to the other to obtain the most satisfactory position.

With my holder the foregoing objections have been overcome in a very simple and economical manner, as will hereinafter be described more in detail.

In the drawing, Fig. 1 is a plan view of my improved holder.

Fig. 2 is a vertical sectional view through the container of Fig. 1 taken along line 2—2 of Fig. 1.

Fig. 3 is a plan view of a holder of slightly different shape from that of the holder shown in Fig. 1.

Fig. 4 is an elevational view of the holder of Fig. 1 on a supporting surface with the lower ends of the stems of flowers indicated therein, the flower, leaves, etc. being omitted.

In detail, my improved holder comprises a relatively short, open-ended tubular member 1, which may be of any desired rigid or semi-rigid material such as cardboard, or one of the many present hardened plastics, or of glass, porcelain, china, metal, etc. This member may be annular, as shown in Fig. 1, or polygonal as indicated at 1' in Fig. 2, but in its preferred form, the walls are parallel with its central axis.

The member 1 (or 1') is filled with a substantially non-hardening, relatively stiff, but readily moldable clay-like plastic material 2, such as the so-called non-drying modeling clay used by artists. Material may comprise, by weight, eighty parts chalk, ten parts rosin, six parts petrolatum, such as "Vaseline," and four parts paraffin, which material will adhere to the walls of the member 1 and to a hard supporting surface, whether glazed or unglazed, with sufficient tenacity to support the flowers on stems 3 (Fig. 4) in any desired flower arrangement without becoming detached from the supporting surface 4. The stems 3, however, are readily inserted in the material 2, and the material is sufficiently stiff and adherent to prevent the stems from moving in the material, but the material will not pull out of the member 1 with the stems when the flowers are removed.

The member 1 is preferably filled with the material 2 so that the exposed surfaces of the material are slightly convex and project slightly beyond the level of the edges of the member 1, as indicated in Fig. 2. Thus the holder may be inverted and either of said surfaces may become the lower side for engaging the supporting surface 4.

In operation the holder is placed on the desired supporting surface, and is then tightly forced against said surface, preferably accompanied by a slight rotary motion to insure flattening of the lower exposed surface of the material 2. Where the member 1 is of semi-rigid material, a gripping pressure at opposite sides adjacent the upper edges of member 1 will tend to force the material 2 against the supporting surface, or if the member 1 is rigid and the material 2 is level with the lower edges of the member, a slight pressure on the upper surface of material 2 will force the material into tight engagement with the supporting surface. Thus, the same side may be resecured to a supporting surface repeatedly, and the edges of the member 1 coact with the material 2 to resist release of the material from the supporting surface. At any time the holder may be inverted and the member 1 will in all instances hold the material against lateral distortion, and said member lends itself to any form of surface coloring or decoration or surface design. The material 2 may, of course, be of any color desired by merely using colored chalk or any desired coloring material.

Having described my invention, I claim:

1. A flower holder comprising an open-ended, relatively short, tubular member filled to its open ends with a substantially non-hardening, clay-like, plastic material.

2. A flower holder comprising an open-ended, relatively short, tubular member enclosing a mass of substantially non-hardening, clay-like, plastic material, with a portion of said material slightly extending beyond the edges of said member at one of the ends of the latter for engaging a supporting surface; said mass of material being supported within said member by the walls of the latter and being of substantial thickness in direction axially of said member for supporting flowers having their stems inserted therein when said portion is in engagement with a supporting surface.

3. A flower holder comprising an open-ended, relatively short, tubular member enclosing a mass of substantially non-hardening, clay-like, plastic material therein; a portion of said material projecting slightly outwardly of opposite ends of said member for engagement of the said portion at either of said ends with a substantially horizontally disposed supporting surface.

4. A flower holder comprising an open-ended, tubular member enclosing a mass of substantially non-hardening, clay-like, plastic material therein; a portion of said material projecting slightly outwardly of one of the ends of said member for engagement of the said portion at said latter ends with a substantially horizontally disposed supporting surface, and the sides of said member axially thereof being substantially parallel whereby said material may be pushed toward either of said ends upon pressure being applied to said material at one or the other of said ends axially of said member.

EDMOND C. MATIGNON.